I. HEIDENREICH.
ADVERTISING NOVELTY.
APPLICATION FILED MAR. 14, 1917.
1,235,799.
Patented Aug. 7, 1917.
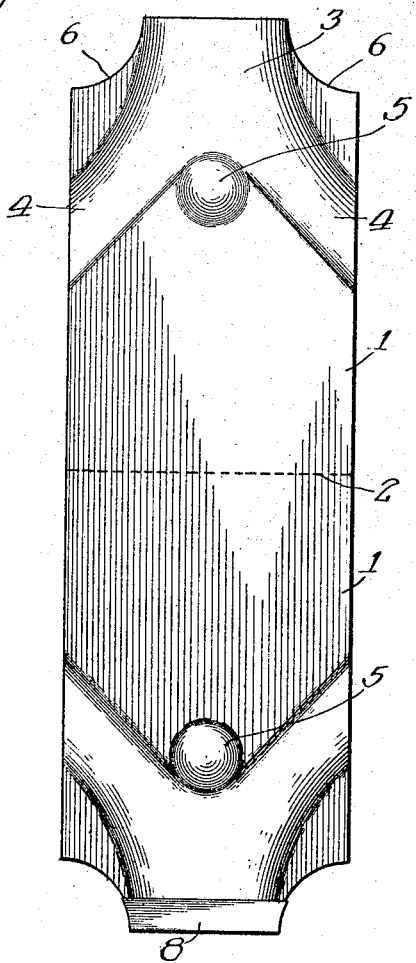
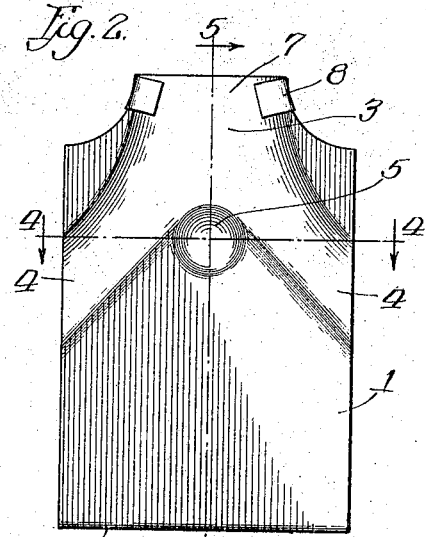
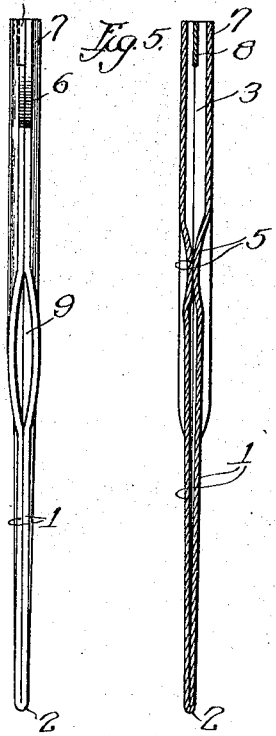
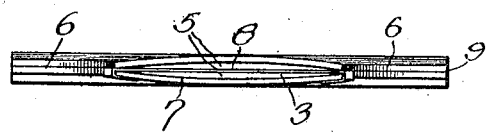
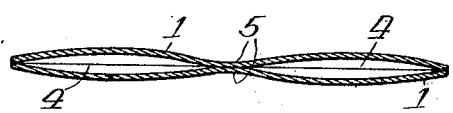
Witness
Inventor:
Isidor Heidenreich.
By George Bayard Jones
Atty.

UNITED STATES PATENT OFFICE.

ISIDOR HEIDENREICH, OF CHICAGO, ILLINOIS.

ADVERTISING NOVELTY.

1,235,799.  Specification of Letters Patent.  Patented Aug. 7, 1917.

Application filed March 14, 1917. Serial No. 154,669.

*To all whom it may concern:*

Be it known that I, ISIDOR HEIDENREICH, citizen of the United States, residing at Chicago, in the county of Cook and State of Illinois, have invented a certain new and useful Improvement in Advertising Novelties, of which the following is a full, clear, concise, and exact description.

This invention relates to improvements in advertising novelties and more particularly to an advertising novelty adapted for use as a whistle.

One object of the invention is the provision of means whereby a current of air blown into the whistle is first directed in a path substantially longitudinal thereof, and then conducted in a path at an angle to said longitudinal path and emitted from said whistle along the sides thereof. Another object of the invention is the provision of a device of the character described, which shall be simple in construction and operation and inexpensive to manufacture.

Other objects and advantages will be apparent from the following description, taken in connection with the accompanying drawings, wherein the preferred embodiment of the invention is illustrated.

Figure 1 is a plan view of the whistle prior to the folding of its leaves.

Fig. 2 is a plan view of the whistle showing the leaves folded.

Fig. 3 is a side elevation.

Fig. 4 is a section on the line 4—4 of Fig. 2.

Fig. 5 is a section on the line 5—5 of Fig. 2; and

Fig. 6 is an end view.

Referring more in detail to the drawings, the whistle is shown as comprising a plurality of leaves 1, preferably two in number, said leaves being hinged at their inner edges as shown at 2, in any preferred manner. Each leaf 1 is preferably embossed or otherwise pressed outwardly near its outer end to form a substantially Y-shaped channel therein, the stem 3 of said channel being shown extending in from the top edge of the leaf, substantially along the longitudinal axis thereof, and the legs 4 branching off from said stem and extending downwardly and outwardly to the side edges of said leaf, substantially as shown.

At the point where the legs 4 of each of the Y-shaped channels join the stem 3, a small button 5 is embossed or otherwise formed. These buttons are pressed inwardly in the leaves 1, whereas the Y-shaped channels are pressed outwardly, as above described. The outer corners of each leaf are cut away, substantially as shown at 6 to provide a mouth piece 7 for the whistle, when the two leaves are folded together as shown in Fig. 2 of the drawings. It will be noted from the above, that the construction of each of the leaves is substantially identical with that of the other, the Y-shaped channels, the buttons, and the cut-away portions being adapted to register when the leaves are folded. The reed 8 is secured in any preferred manner to the end of one of the leaves, and is adapted to extend across and between the stems 3 of the embossed channels, when said leaves are folded, as above described, the same being adapted to vibrate freely when air is blown in through the mouth piece 7, to thereby produce the desired musical sound.

When the leaves are folded, the channels coöperate to form a passage adapted to conduct the air blown in through the mouth piece 7, substantially along the longitudinal axis of the whistle to the point where the legs 4 of said channels join the stems 3. At this point, the air current is divided and is directed downwardly and outwardly and emitted along the side edges of the whistle. The embossed buttons 5, it will be noted, coöperate with the Y-shaped channels to aid in dividing the air current as it is blown into the whistle, and to also prevent said channels from being depressed or flattened out when the whistle is held between the fingers or in the hands of the operator.

From the foregoing, it will be observed that a whistle has been provided, the leaves 1 of which may be made flat, thereby permitting of the same contacting with one another over substantially their entire inner surfaces, excepting along the passage formed by the registering of the Y-shaped channels. The ends of the channels, it will be noted, when the leaves are folded, form elongated outlets 9 along the side edges of the whistle, through which the air blown into the same is emitted.

While the embossed passages in the leaves 1 have been shown and described as of substantially Y-shape, it will be noted that said passages may be made of other configurations if desired. For instance, the channels might be formed with only one diagonal passage instead of two as shown, or the channel might be formed in only one of the leaves instead of both, the other being made substantially flat. Furthermore, the leaves may be hinged along the side edges thereof, instead of along their inner edges as shown.

It will be noted that various other changes and modifications may also be made in the structure herein illustrated and described, without departing from the spirit of the invention, and the right is therefore reserved to make such changes as fall within the scope of the appended claims.

Having thus described my invention, what I claim as new and desire to secure by Letters Patent of the United States is:

1. A whistle of the class described, comprising a plurality of leaves adapted to be folded flat one against the other and means whereby air may be directed in between the ends of said leaves and out between the sides thereof to sound said whistle.

2. A whistle of the type described, comprising a plurality of leaves, one of which is provided with a downwardly and outwardly extending channel, a mouth piece at one end of said channel and an outlet at the other end thereof.

3. A whistle of the type described, comprising a plurality of leaves, one of which is provided with a downwardly and outwardly extending channel, a mouth piece at one end of said channel and an outlet at the other end thereof, said mouth piece being positioned at the upper end of said leaves, and said outlet being positioned at the sides thereof.

4. A whistle of the type described, comprising a plurality of leaves adapted to be folded one against the other, channels embossed therein and adapted to form a passage therebetween when said leaves are folded together.

5. A whistle of the type described, comprising a plurality of leaves adapted to be folded one against the other, channels embossed therein and adapted to form a passage therebetween when said leaves are folded together, said passage being of substantially Y-shape and having its inlet along the upper edges of said leaves and its outlet along the sides thereof.

6. A whistle of the type described, comprising a plurality of leaves adapted to be folded one against the other, channels embossed therein and adapted to form a passage therebetween when said leaves are folded together, said passage being of substantially Y-shape and having its inlet along the upper edges of said leaves and its outlet along the sides thereof, and means coöperating with said channels to retain the same in spaced relation.

7. A whistle of the type described comprising a plurality of leaves adapted to be folded one over the other and a channel embossed in one of said leaves.

In witness whereof I hereunto subscribe my name this 3rd day of March, A. D. 1917.

ISIDOR HEIDENREICH.

Copies of this patent may be obtained for five cents each, by addressing the "Commissioner of Patents, Washington, D. C."